United States Patent
Berman

[11] 3,902,110
[45] Aug. 26, 1975

[54] CHOPPER DUTY MAXIMIZATION CIRCUIT
[76] Inventor: Alby M. Berman, 14800 Borgman, Oak Park, Mich. 48237
[22] Filed: Dec. 1, 1972
[21] Appl. No.: 311,183

[52] U.S. Cl.............. 321/43; 307/252 J; 307/252 M; 321/45 C; 323/22 SC; 323/38
[51] Int. Cl. ............................................ H02m 3/14
[58] Field of Search.......... 321/43, 45 C; 307/252 J, 307/252 M; 323/22 SC, 34–38

[56] References Cited
UNITED STATES PATENTS

| | | | |
|---|---|---|---|
| 3,659,119 | 4/1972 | Kasama et al. .................... | 321/43 X |
| 3,660,738 | 5/1972 | Anderson....................... | 321/45 C X |
| 3,693,069 | 9/1972 | Kelley, Jr. et al..................... | 323/24 |
| 3,742,333 | 6/1973 | Yurick .............................. | 321/45 C |

*Primary Examiner*—Gerald Goldberg
*Attorney, Agent, or Firm*—Gerald E. McGlynn, Jr. et al.

[57] ABSTRACT

The duty cycle of a power controlled switch connected in series with a battery and a direct current motor is regulated to control the motor power. Conduction by the power controlled switch is initiated by gate signals from a trigger source, and a shut-off circuit including a shut-off controlled switch and a shut-off capacitor controllably terminates each conduction interval by reverse biasing the power controlled switch. A recharge controlled switch recharges the shut-off capacitor between successive commutations of the power controlled switch. The trigger source provides gate signals for the shut-off controlled switch and the recharge controlled switch as well as the power controlled switch. To maximize the duty cycle of the power controlled switch, and simultaneously obviate overlaps in the conductive states of the shut-off controlled switch and the recharge controlled switch, a control circuit is provided to monitor the shut-off controlled switch and disable the trigger source when the shut-off controlled switch is conductive. The control circuit includes a transistor connected across the anode-cathode terminals of the shut-off controlled switch. This transistor cycles on and off in response to the conductive state of the shut-off controlled switch, and it is effective to enable or disable an AND gate in the trigger circuitry to control the application of trigger signals to the recharge controlled switch.

10 Claims, 1 Drawing Figure

PATENTED AUG 26 1975　　　　　　　　　　　　　　3,902,110
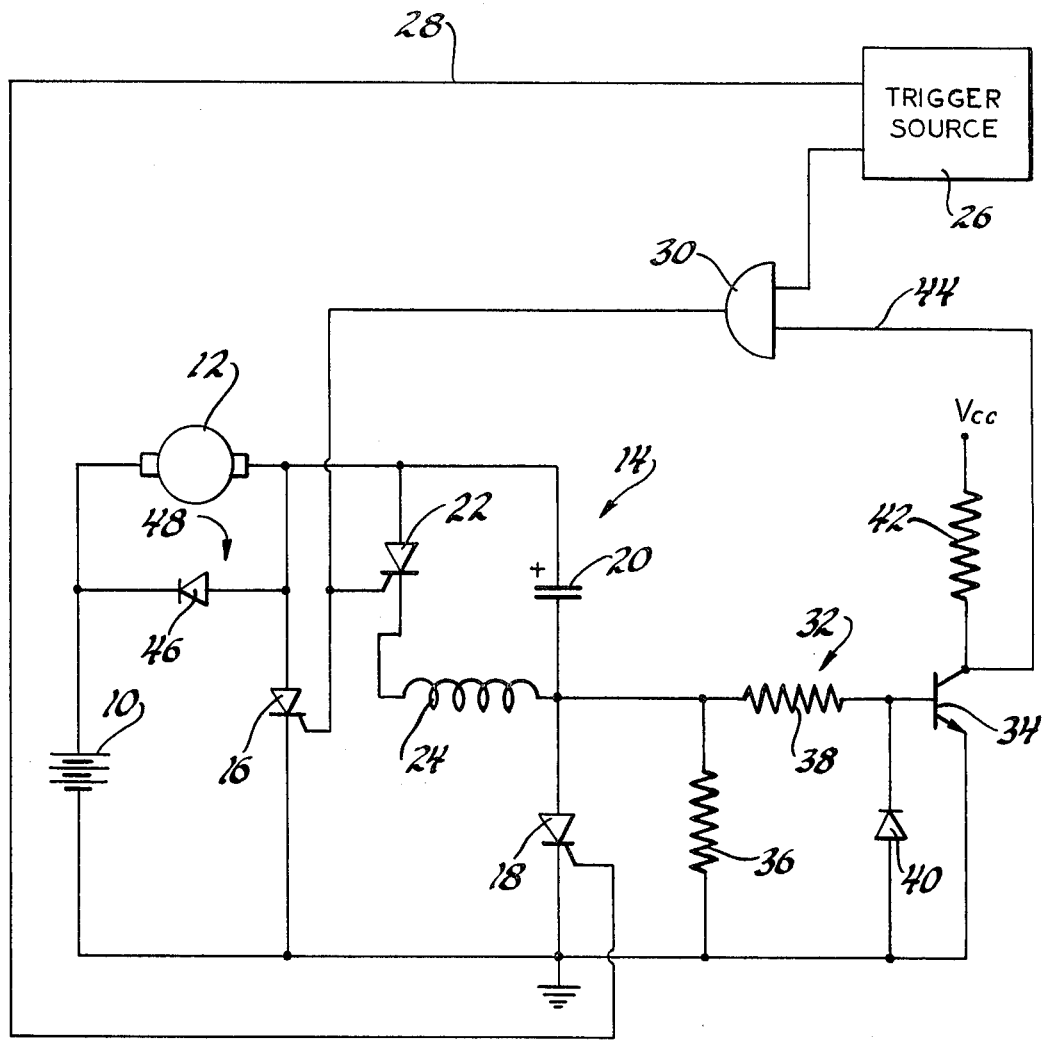

CHOPPER DUTY MAXIMIZATION CIRCUIT

This invention relates to a switching circuit or chopper for controlling the power supplied from an electrical source to an electrical load.

Chopper circuits regulate the power supplied from a direct current source to a direct current load by controlling the percentage of time that the source and load are interconnected. Typically a power controlled switch is serially connected with the electrical source and the electrical load, and power control is effected by duty cycle modulation of this power controlled switch.

Gate signals or trigger signals are applied to the power controlled switch to render it conductive. The time between two successive gate signals or trigger signals to the power controlled switch defines the time of one cycle, and the percentage of that time during which the power controlled switch is conductive defines the duty cycle for that switch.

A shut-off capacitor and a shut-off controlled switch are connected in a series circuit across the anode-cathode terminals of the power controlled switch and the shut-off controlled switch is gated conductive to apply the voltage of the shut-off capacitor as a reverse bias voltage across the power controlled switch to controllably terminate conduction by the power controlled switch. A recharge circuit resets the shut-off capacitor with the proper polarity voltage after each commutation of the power controlled switch; this recharge circuit includes a recharge controlled switch shunting the shut-off capacitor.

In the operation of the chopper or duty cycle modulator described, a malfunction occurs if the recharge controlled switch and the shut-off controlled switch are conductive at the same time. In the prior art, this limitation on chopper operation has been accommodated by providing a fixed time in each cycle during which the recharge controlled switch is maintained non-conductive. This fixed, non-conductive time for the recharge controlled switch is selected to straddle the conductive time for the shut-off controlled switch so that simultaneous conduction by the two switches is impossible.

The present invention addresses the problem of overlap in conduction between the shut-off controlled switch and the recharge controlled switch. Rather than sacrifice or limit the range of duty cycle control, the present invention monitors conduction by the shut-off controlled switch and disables the trigger circuitry when the shut-off controlled switch is conductive to preclude simultaneous conduction by the recharge controlled switch. In this manner, the present invention affords maximum control of the pulse modulator duty cycle; the duty cycle of the pulse modulator is not unnecessarily limited as in the prior art.

In the present invention a control circuit is connected across the shut-off controlled switch to develop a signal responsive to the conductive state of the shut-off controlled switch. The control circuit includes a transistor switch that is turned on and off by the voltage across the shut-off controlled switch which in turn enables and disables the trigger circuitry to control the application of gate signals to the recharge controlled switch.

The instant invention can be best understood by reference to the following description of a preferred embodiment taken in conjunction with the circuit schematic of the accompanying single FIGURE drawing.

In the drawing, a direct current source 10, illustrated as a battery, supplies electrical energy to a direct current motor 12 through a pulse modulator or chopper 14. The chopper 14 includes a power controlled switch 16, a shut-off controlled switch 18, a shut-off capacitor 20, a recharge controlled switch 22, and a recharge inductor 24. Power controlled switch 16, shut-off controlled switch 18, and recharge controlled switch 22 are preferably semiconductor controlled switches such as, for example, silicon controlled rectifiers. A conventional trigger source 26 develops gate signals for gating the power controlled switch 16, the shut-off controlled switch 18, and the recharge controlled switch 22 at predetermined times. Shut-off controlled switch 18 is connected by a line 28 directly to the trigger source 26; a gate means comprising an AND gate 30 interconnects the trigger source 26 with power controlled switch 16 and recharge controlled switch 22.

A control circuit 32 monitors the conduction of the shut-off controlled switch 18. The control circuit 32 is connected to the trigger circuitry comprising the trigger source 26 and the AND gate 30 to prevent switching of the recharge controlled switch 22 when the shut-off controlled switch 18 is conductive. In particular the control circuit 32 enables and disables the AND gate 30 to control whether the AND gate 30 passes trigger signals from the trigger source 26 to the power controlled switch 16 and the recharge controlled switch 22.

The control circuit 32 includes a voltage controlled switch comprising a transistor 34 that is switched on and off by the anode-cathode voltage of the shut-off controlled switch 18. The base-emitter circuit of the transistor 34 is connected across the shut-off controlled switch 18; two resistors 36 and 38 and a diode 40 are included in the base-emitter circuit of the transistor 34 to process the input from the anode-cathode terminals of the shut-off controlled switch 18. A bias source $V_{CC}$ is connected through a resistor 42 to the collector of the transistor 34.

When the shut-off controlled switch 18 is conductive, transistor 34 is on, and the collector-emitter voltage of transistor 34 is low. This low collector-emitter voltage of transistor 34 is connected with the AND gate 30 to disable the AND gate when the shut-off controlled switch 18 is conductive. The trigger source 26 cannot gate the power controlled switch 16 or the recharge controlled switch 22 conductive when the AND gate 30 is disabled by a low voltage from the transistor 34. When the shut-off controlled switch 18 is non-conductive the transistor 34 is off, and the collector-emitter voltage is high. The AND gate 30 is enabled by a high collector-emitter voltage from the transistor 34, and the trigger source 26 can gate power controlled switch 16 and recharge controlled switch 22 through the AND gate 30 when the collector-emitter voltage is high.

At the end of each cycle of operation for the chopper, all components in the chopper are in a quiescent state, and the shut-off capacitor 20 is fully charged with the polarity indicated on the drawing: all three controlled switches are off and current circulates in a circuit comprising the motor 12 and a free wheeling diode 46 with a sense indicated by the arrow 48.

Subsequently, at the outset of each cycle, the power controlled switch 16 and the recharge controlled switch 22 are gated conductive. Power controlled switch 16 completes a circuit path from the positive terminal of the battery 10 through the motor 12 and through the power controlled switch 16 to the negative terminal of the battery 10. Recharge controlled switch 22 provides a circuit path through which the shut-off capacitor 20 is charged or reset with a polarity opposite to that shown on the drawing. The recharge inductor 24 assists in ringing the "reverse" voltage on the shut-off capacitor 20. After the shut-off capacitor 20 is fully charged with this "reverse" polarity, the recharge controlled switch 22 ceases conduction in view of the reverse bias voltage applied across the recharge controlled switch 22 by the shut-off capacitor 20.

Subsequently the trigger source 26 gates the shut-off controlled switch 18 conductive to apply the voltage accumulated on the shut-off capacitor 20 (recall that the voltage on capacitor 20 has a polarity opposite to that indicated on the drawing in view of the action of the recharge controlled switch 22) across the cathode-anode terminals of the power controlled switch 16 to reverse bias and thereby shut off that controlled switch. After the power controlled switch 16 ceases conduction, the motor 12 continues to be powered in a circuit traced from the positive terminal of battery 10 through the motor 12, through the shut-off capacitor 20, and through the shut-off controlled switch 18 to the negative terminal of the battery 10. The motor 12 is powered through this circuit until the shut-off capacitor 20 attains a full charge having the polarity indicated on the drawing at which time the shut-off controlled switch 18 ceases conduction. Thereafter the battery 10 is isolated from the motor 12, but the motor 12 is provided current continuity through the diode 46 in accordance with the current arrow 48. This cycle repeats in the operation of the chopper.

In the present invention the control circuit 32 monitors the voltage across the anode-cathode terminals of the shut-off controlled switch 18. When the shut-off controlled switch 18 is conductive, the anode-cathode voltage is positive, the transistor 34 is biased on, and the AND gate 30 blocks gate signals from the trigger source 26. When the shut-off controlled switch 18 ceases conduction after commutating the power controlled switch 16, the anode-cathode voltage of shut-off controlled switch 18 is negative, the transistor 34 is biased off, and the AND gate 30 passes gate signals from the trigger source 26 to the power controlled switch 16 and the recharge controlled switch 22.

All of the foregoing has proceeded in terms of a particular preferred embodiment. It is to be understood that various changes and modifications could be engrafted thereon by one skilled in the art within the spirit and scope of the appended claims.

The embodiments of the invention in which an exclusive property or privilege is claimed are defined as follows:

1. In a switching circuit including a power controlled switch, a shut-off controlled switch, a shut-off capacitor, a recharge controlled switch, and trigger circuitry for controllably switching each of said controlled switches to the conductive state, the improvement comprising a control circuit monitoring the conduction of said shut-off controlled switch, said control circuit being connected to said trigger circuitry to prevent said trigger circuitry from switching said recharge controlled switch to the conductive state when said shut-off controlled switch is in the conductive state thereby obviating simultaneous conduction by said recharge controlled switch and said shut-off controlled switch.

2. A switching circuit as in claim 1, wherein said control circuit is connected across said shut-off controlled switch.

3. A switching circuit as in claim 2, wherein said control circuit is connected to said trigger circuitry to prevent said trigger circuitry from switching said power controlled switch to the conductive state when said shut-off controlled switch is in the conductive state.

4. A switching circuit as in claim 3, wherein said control circuit senses the voltage across said shut-off controlled switch to determine when said shut-off controlled switch is in the conductive state.

5. A switching circuit as in claim 4, wherein said control circuit comprises a voltage controlled switch.

6. A switching circuit as in claim 5, wherein said voltage controlled switch is a transistor.

7. A switching circuit as in claim 6, wherein the base-emitter circuit of said transistor is supplied a voltage proportional to the voltage across said shut-off controlled switch.

8. A switching circuit as in claim 7, wherein the collector-emitter voltage of said transistor is applied to said trigger circuitry to prevent said trigger circuitry from switching said power controlled switch or said recharge controlled switch to the conductive state when said shut-off controlled switch is in the conductive state.

9. A switching circuit as in claim 8, including a gate means to supply switching signals to said power controlled switch and said recharge controlled switch, said collector-emitter voltage being applied to said gate means such that said gate means is disabled or enabled in response to said collector-emitter voltage.

10. A switching circuit as in claim 9, wherein said collector-emitter voltage enables said gate means when said shut-off controlled switch is non-conductive and disables said gate means when said shut-off controlled switch is conductive such that said gate means supplies switching signals to said power controlled switch and said recharge controlled switch only if said shut-off controlled switch is non-conductive.

* * * * *

UNITED STATES PATENT OFFICE
CERTIFICATE OF CORRECTION

Patent No. 3,902,110　　　　　　　　　　Dated August 26, 1975

Inventor(s) Alby M. Berman

It is certified that error appears in the above-identified patent and that said Letters Patent are hereby corrected as shown below:

The following should appear on the face of the patent:

--Assignee: Energy Development Associates, Madison Heights, Michigan--

Signed and Sealed this thirtieth Day of March 1976

[SEAL]

Attest:

RUTH C. MASON
*Attesting Officer*

C. MARSHALL DANN
*Commissioner of Patents and Trademarks*